US006358401B1

(12) United States Patent
Evans

(10) Patent No.: US 6,358,401 B1
(45) Date of Patent: Mar. 19, 2002

(54) APPARATUS AND PROCEDURES FOR REPLENISHING PARTICULATE MATERIALS USED IN INDUSTRIAL PROCESSES

(75) Inventor: Martin Evans, Tolland, CT (US)

(73) Assignee: Intercat Equipment, Inc., Sea Girt, NJ (US)

( * ) Notice: Subject to any disclaimer, the term of this patent is extended or adjusted under 35 U.S.C. 154(b) by 0 days.

(21) Appl. No.: 09/352,985

(22) Filed: Jul. 14, 1999

(51) Int. Cl.⁷ .......................... C10G 11/00; F27B 15/08
(52) U.S. Cl. ................. 208/152; 208/113; 208/120.01; 208/DIG. 1; 422/145; 700/266
(58) Field of Search ............................ 208/113, 120.01, 208/152, DIG. 1; 700/266; 702/23; 422/145

(56) References Cited

U.S. PATENT DOCUMENTS

| | | | | |
|---|---|---|---|---|
| 2,916,441 A | * | 12/1959 | Kruse, Jr. .................... | 208/152 |
| 3,294,675 A | * | 12/1966 | Adams et al. ............... | 208/152 |
| 3,398,085 A | * | 8/1968 | Engle .......................... | 208/157 |
| 3,410,791 A | * | 11/1968 | Perry et al. .................. | 208/143 |
| 3,850,582 A | * | 11/1974 | Luckenbach ................. | 208/152 |
| 4,018,671 A | * | 4/1977 | Andon et al. ................ | 208/152 |
| 4,082,513 A | * | 4/1978 | Andon et al. ................ | 208/152 |
| 4,089,429 A | * | 5/1978 | Stock et al. ................. | 414/200 |
| 4,840,726 A | * | 6/1989 | Wakefield, Jr. ............. | 208/152 |
| 5,389,236 A | * | 2/1995 | Bartholic et al. ........... | 208/152 |
| 5,433,924 A | * | 7/1995 | Sagar et al. ................. | 422/131 |
| 5,968,460 A | * | 10/1999 | Easthamet al. ............... | 423/74 |

\* cited by examiner

*Primary Examiner*—Walter D. Griffin
(74) *Attorney, Agent, or Firm*—Elliot M. Olstein; Raymond J. Lillie

(57) ABSTRACT

Injection of particulate materials into industrial processes can be improved through use of a vessel mounted on a weighing device and which is vented through use of two separate and distinct valves. Optionally, a predetermined pressure in the vessel is maintained through use of a pressure transmitter and an on/off mode of operation.

11 Claims, 1 Drawing Sheet

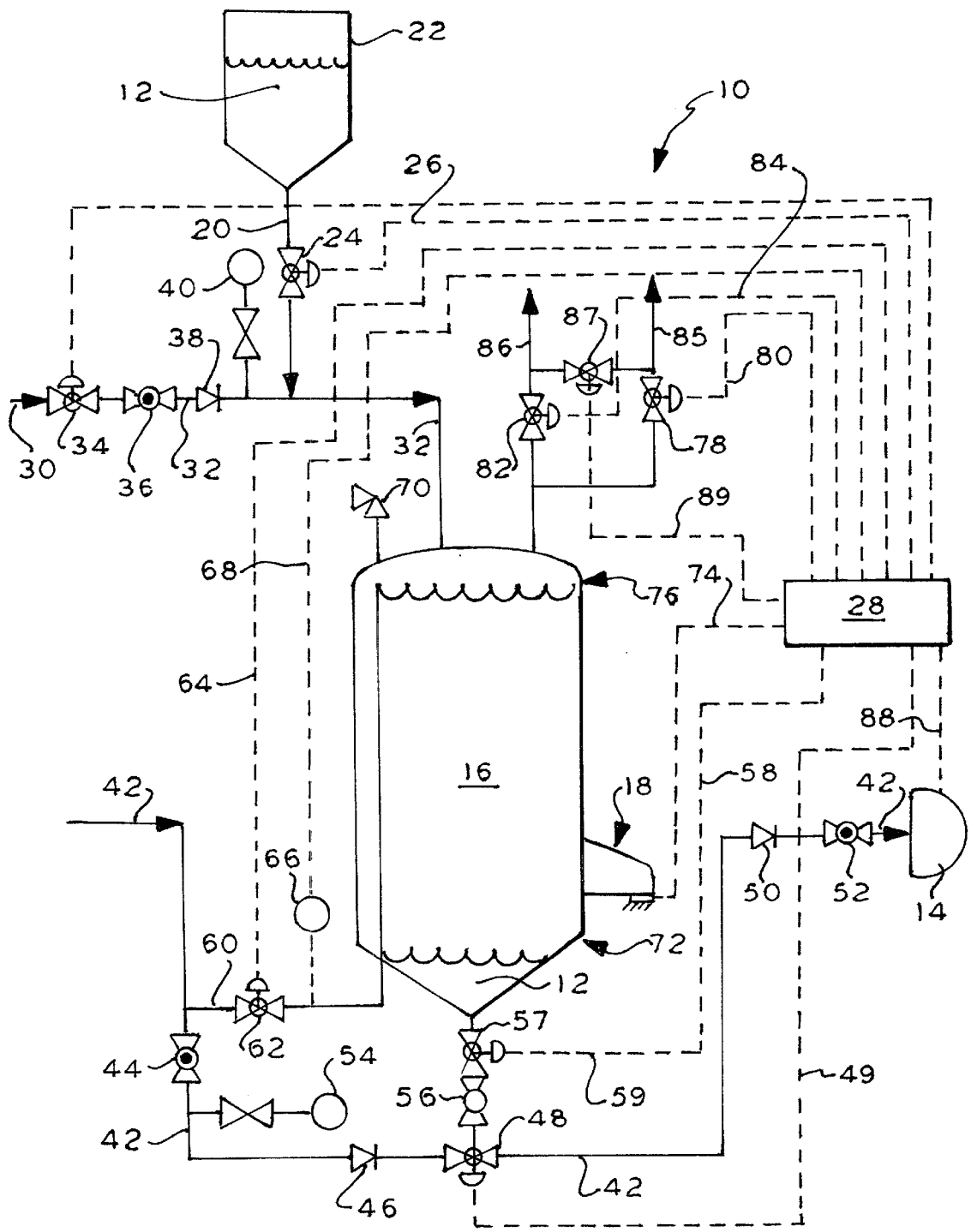

APPARATUS AND PROCEDURES FOR REPLENISHING PARTICULATE MATERIALS USED IN INDUSTRIAL PROCESSES

BACKGROUND OF THE INVENTION

1. Field of the Invention

This invention generally relates to apparatus and procedures for replenishing particulate materials (e.g., bulk catalysts, catalyst additives, particulate raw materials, etc.) for industrial processes (e.g., fluid catalytic processes used to refine petroleum, polymer manufacturing processes, etc.). More particularly, this invention relates to those apparatus and methods calling for injection of particulate materials into industrial processes using streams of high pressure gas (e.g., air, nitrogen, hydrocarbons, etc.) in which the particulate material is entrained.

2. Description of the Prior Art

Particulate materials are employed in many chemical and petrochemical manufacturing processes. Requirements for more closely controlling and adjusting use of such materials can be engendered by any number of anticipated and/or unanticipated changes in such processes, e.g., (1) changing product requirements, (2) changing character of feedstock(s) and/or (3) changing pollution control regulations. Moreover, the ability to more closely control and adjust introduction of particulate materials into most industrial processes serves to minimize the use of, and hence the costs associated with, raw materials, catalysts and energy. The ability to more closely control and adjust industrial processes also usually serves to reduce perturbations to such processes when those pressurized vessels holding raw materials, catalyst, diluents, etc. for use in said processes have to be taken out of service in order to refill them.

Many of those devices and procedures used to replenish particulate materials stored in pressurized vessels that feed into industrial processes call for use of a stream of pressurized gas (usually air) to transfer the particulate material from an unpressurized storage tank to a pressurized process vessel. These materials are then injected into the process by entraining them in another stream of pressurized gas (e.g., air, nitrogen, light hydrocarbon gases, etc.) that feeds into said process.

Unfortunately, significant errors and/or maladjustments were frequently introduced into many industrial processes employing such streams of pressurized gas. Such errors and/or maladjustments generally follow from a combination of two factors: (1) many particulate material delivery systems are controlled by timed meters or clocks and (2) plant air supply systems supplying the streams of pressurized gas may, and often do, operate over a rather wide range of operating pressures. For example, an "assumed" 60 psi plant air supply system would, in fact, operate at pressures ranging from about 30 to 80 psi at any given point in time. Such pressure differences caused timed particulate material injection devices using these air streams to deliver differing amounts of particulate material in different time periods in which plant air pressures varied.

The prior art has addressed this problem in several ways. For example, U.S. Pat. No. 5,389,236 ("the '236 patent") discloses a catalyst addition system wherein a pressurized catalyst vessel is continuously weighed in order to determine how much catalyst is actually added to a fluid catalytic process in any given time period. In other words, this catalyst injection system operates on the basis of the weight of material actually leaving the vessel and injected into the process—regardless of the pressure of the air stream used to deliver the material to that process. The apparatus and methods of the present patent disclosure build upon the weighing procedures taught in the '236 patent; hence said patent is incorporated herein by reference.

The advances made through use of the apparatus and processes of the present patent disclosure revolve around the fact that the pressurized vessels used in such processes are typically operated under pressures ranging from about 30 psi to about 150 psi. Therefore, they must be depressurized before new particulate material supplies (e.g., catalysts, raw materials, diluents, etc.) can be loaded into them. Those skilled in this art will appreciate that this reloading is a time-consuming process. For example, using those vessel venting devices and procedures on the catalyst addition systems taught by the '236 patent, a typical refilling operation (comprised of [1] depressurizing the vessel from an operating pressure ranging from about 30 to about 150 psi, [2] refilling the vessel with particulate material and [3] repressurizing the vessel back to a 30–150 psi operating pressure) may take from about 60 to about 120 minutes for vessels having a capacity for about 10–15 tons of particulate material.

Such rather lengthy time requirements follow, in large part, from the fact that the depressurization process, and especially the first part of that depressurization process, must proceed very slowly. Otherwise, any particulate material still remaining in the vessel (and there usually is some) when it is vented will be entrained in the departing air and lost from the system. This will be especially likely if the initial phase of the vessel depressurization process proceeds too quickly (i.e., so quickly that any significant amount of particulate material in the vessel is, in effect, sucked out of said vessel along with the pressurized gas being vented). Particulate material losses of this kind have at least two bad consequences. First, valuable materials such as catalysts will be wasted; and second, any particulate material entrained in a stream of rapidly released gas through the vessel's venting system may clog or otherwise interfere with operation of equipment "downstream" of that venting system (e.g., gas silencers, electrostatic precipitation units, dust-catching bag units, etc.).

There is, however, a competing drawback to venting these pressurized vessels too slowly. This drawback follows from the fact that while such a vessel is being depressurized, refilled with fresh particulate material and again repressurized, it is no longer capable of injecting its particulate material contents into the industrial process it serves. In short, the vessel is "down" while it is being resupplied with particulate material. Consequently, if the process using the particulate material is scheduled to receive a shot or stream of the particulate material during the 60–120 minutes that the vessel is down for its resupply routine, injection of scheduled shot(s) or stream(s) of the material must be deferred until the vessel is again put back into service. Likewise, if the process needs an unscheduled shot or stream of the particulate material, this unscheduled addition also must be deferred until the vessel is again brought back into service. Those skilled in the chemical engineering arts will of course appreciate that the longer a scheduled or needed injection of catalyst or raw material is deferred, the greater the perturbation to most ongoing chemical processes. Hence, there is an ever pressing demand to shorten the time needed to recharge a pressurized vessel whose normal duty is to feed an industrial process with a particulate material at time intervals that are shorter (e.g., every 10 minutes) than the down time (e.g., 45–60 minutes) associated with replenishing the vessel with fresh particulate material. In many cases, if these refill times can not be shortened, very expensive duplicate pressure vessel systems must be employed.

Heretofore, the depressurization aspect of these vessel replenishing operations has been carried out in one of two ways. The first way involves the use of a single "on/off" type valve (such as a so-called ball type valve) having a very small opening. The second way employs valves that are capable of producing proportional or variable sized openings ("proportional valves"). Use of a single, ball type, valve in such venting operations has the advantage of simplicity of operation and maintenance. Such valves must, however, have a very small vent opening so that an initial, large volume, surge of escaping air does not suck particulate material out of the vessel. Use of such small, ball type, vent valves does, however, imply long decompression times. This follows from the fact that as the pressure decreases, the rate of depressurization also decreases. For example, depressurization of a 10–15 ton catalyst vessel from about 60 psi to atmospheric pressure using a 1.0 inch, ball type, vent valve will usually take from about 30 to about 60 minutes. Obviously, this is a significant portion of the overall 60–120 minute vessel refilling operation associated with vessels of this size.

Proportional valves have the advantage of being able to open very, very slightly in order to initiate a vessel depressurization process in a manner such that only a very small volume of high pressure air is initially allowed to escape. This circumstance prevents particulate material from being sucked out of the vessel—which, here again, would be the case if an initial, large volume, surge of high pressure air were allowed to vent too quickly. As the pressure in a vessel gradually goes down, these proportional valves are opened further and further so that larger and larger volumes of air—at lower and lower pressures—can be vented without sucking particulate material out of the vessel along with the departing air.

Thus, use of proportional valves generally allows a vessel to be vented more quickly than it could be using a single, small vent size, ball valve. Proportional valves do, however, have certain very significant disadvantages associated with their use. For one thing, they are considerably more complex than ball type valves. Hence they are much more expensive. Worse yet, they also are generally much more difficult to install, operate and maintain. These drawbacks follow in part from the fact many industrial valves (proportional type valves as well as ball type valves) are mechanically driven by fluid pressure systems (air pressure systems, hydraulic systems and the like). Thus, once a CPU gives an order (an electrical signal) to open or close a valve, it is inherently much more difficult for a fluid pressure system to take that signal and convert it into a very slight adjustment in the size of a vent opening in a proportional valve than it is for the very same fluid pressure system to create the more decisive on/off action in a ball type valve whereby said valve is either fully opened or fully closed. Moreover, use of proportional valves implies that any CPU used to control operation of that proportional valve must be able to receive and give "proportional" type electrical signals rather than simple on/off type signals. Indeed, because of the nature and magnitude of the problems associated with the use of proportional valves in particulate material injection processes, many industrialists, and especially petroleum refiners, generally prefer to use the more reliable, single ball valve-based, venting technique and "live with" the longer time periods they take to depressurize a vessel.

SUMMARY OF THE INVENTION

In response to the tradeoff problems associated with entraining particulate material in an air stream that is too quickly vented from a vessel—versus taking inordinately long periods of time to refill those vessels, and thereby perturbing the industrial process being fed by said vessels—applicant has developed certain apparatus and procedures for more quickly replenishing those vessels whose main duty is to supply particulate materials to an ongoing industrial process. These apparatus and procedures take shorter time periods to vent the vessel (e.g., 5–10 minutes to vent a 10–15 ton catalyst vessel as opposed to the 30–60 minutes needed to vent the same vessel using single ball valve based venting operations). Use of applicant's apparatus and procedures also avoids the above-noted proportional signal based problems associated with using proportional valves.

To these ends, applicant's apparatus and procedures employ two or more, on/off type, vent valves of different sizes. These vent valves can be sized such that the operating pressure in a particle containing vessel will be gradually released, in low volumes, when the vessel is initially depressurized. Thereafter, the pressurized gas can be released in larger volumes when a predetermined lower pressure is reached and thereby speed up the overall depressurization process. That is to say that, after an initial first phase depressurization operation is completed through use of a first, relatively smaller, on/off type vent valve (e.g., a ball valve having a 1.0 inch vent diameter), a second, on/off type valve, of larger diameter (e.g., a ball valve having a 3.0 inch vent diameter) is opened to release larger volumes of the pressurized gas in a second phase of an overall depressurization process. Release of these larger volumes of gas at the lower pressures extant in this second phase of the depressurization process serves to shorten the overall time needed to depressurize the vessel (again, relative to use of a single, on/off type valve venting system). Consequently, the operational advantages associated with the use of on/off type valves can be gained and the decompression periods shortened—without the need for a CPU having the ability to process proportional type electrical signals in order to partially open a proportional valve. In one particularly preferred embodiment of this invention, the first depressurization phase is carried out using a first, ball type, vent valve whose air passage is at least 50% smaller in inside air passage diameter than a second, ball type, vent valve used in the second phase of the depressurization process. In many cases the first vent valve will be 90% smaller than the second vent valve. In one particularly preferred embodiment of this invention, the first vent valve will continue with its venting function during the second phase of the venting process. Again, in most cases, the second venting phase will not commence until the first venting phase has lowered the vessel pressure by at least 50% (e.g., from 60 psi to 30 psi).

In yet another preferred embodiment of this invention, upon being refilled with particulate material, the vessel will be repressurized using a first, relatively large, injection valve system and a second, relatively small (i.e., relative to the first injection valve), gas injection valve system. The main function of this first, relatively large, injection valve system will, however, be to deliver particulate material to the vessel. That is to say that the particulate material is delivered to the vessel entrained in an air stream sent to said vessel via the first, relatively larger valve. The particulate material "falls out" of this air stream when it changes direction in the vessel and is vented out of said vessel. Thereafter, this relatively large first injection valve system can be used to deliver pressurized air (which is then not carrying particulate material with it) to the vessel in order to help repressurize said vessel. In another preferred embodiment of this invention, both the first and second injection valve systems are employed to bring the vessel to a predetermined first repressurization level (e.g., 50 psi) while only the second, gas injection valve system is used to bring the vessel pressure from the first predetermined first repressurization level (e.g., 50 psi) to a second (and usually final) operating pressure (e.g., 60 psi). In any case, the main function of the second, relatively smaller, gas injection valve is to deliver a relatively smaller stream of air (relative to that delivered by the first relatively larger, injection valve) to the vessel in order to bring the vessel to the second (and usually final) predetermined operating pressure (e.g., a 60 psi operating pressure for a 10–15 ton vessel). This repressurization procedure serves to prevent the first relatively large valve system from "overshooting" the desired final operating pressure (e.g., 60 psi). This overshooting can follow from the fact that larger valves generally have longer signal response times than smaller valves. The second, smaller injection valve also is better able to make certain hereinafter more fully described ongoing adjustments in the vessel's operating pressure.

Next, it should be noted that this second, relatively small, gas injection valve could be connected to the vessel in conjunction with a mechanical pressure regulator; and such a mechanical pressure regulator could be used to independently control the vessel's pressure. In which case, the CPU controlling the apparatus and processes of this patent disclosure would not be needed to detect the operating pressure in the vessel. That is to say that a mechanical pressure regulator could be adjusted locally by the operator. Indeed, in many prior art vessel repressuring systems, a ball valve was used in conjunction with a pressure regulator in repressuring procedures wherein the ball valve was opened and the pressure regulator allowed air pressure into the vessel until it reached a given set point (e.g., 60 psi). Applicant has, however, found that use of such a mechanical pressure regulator for this purpose is less preferred in the apparatus and processes of this patent disclosure. This preference follows from the fact that mechanical pressure regulator set pressures (e.g., 60 psi) could be inadvertently adjusted to levels slightly below the pressure that a CPU is "looking for"; consequently, the CPU will not restart particulate material additions because the sought after pressure will not be high enough.

Therefore, in some of the more preferred embodiments of this invention, a mechanical pressure regulator will not be employed to permanently set the vessel's operating pressure. Instead, such a pressure regulator will be replaced with a pressure transmitter that is in continuous communication with the CPU that controls the apparatus and procedures of this patent disclosure. Thus, in this preferred embodiment, applicant's CPU will need to be modified, in ways known to those skilled in this art, to enable it to read the vessel's pressure using signals generated by the pressure transmitter. This pressure transmitter can be used to continuously monitor and adjust the vessel's operating pressure. In the most preferred embodiments of this invention, a desired operating pressure in a vessel (e.g., 60 psi) will be detected by the pressure transmitter and maintained by a logic program in the CPU. This logic program is, most preferably, set up to control the pressure in the vessel in a manner similar to the way a central heating controller in a home heating system controls the home's temperature. That is to say, such home heating systems are either "on" or "off" as the temperature falls below or raises above a set level temperature (e.g., 68° F.).

When using such an on/off control system in the processes of this patent disclosure, if the pressure in the vessel falls a predetermined amount below, e.g., about 3% below, a given setpoint (e.g., 3% below a 60 psi operating pressure), a valve controlling the pressurized air supply to the vessel is opened by a signal from the CPU. For example, when such a pressure transmitter informs the CPU that the vessel pressure has fallen to the prescribed level (e.g., 58.2 psi or 3.0% of 60 psi), the relatively smaller gas injection valve of applicant's apparatus will be opened. When the pressure reaches another higher predetermined pressure, e.g., about 3% above the set pressure (61.8 psi or 3% of 60 psi), the valve will be shut off.

Thus, the apparatus and procedures of this patent disclosure are generally characterized by their use of (1) a computer control unit, (2) at least one weighing device such as a load cell to determine the amount of particulate material in a pressurized vessel and thereby determine when a vessel recharge signal—generating amount of the particulate material has been reached, (3) two separate and distinct venting valves, of different size, that each operate on an on/off mode of operation (e.g., ball type valves) and, optionally, (4) use of two injection valves, of different size, to repressurize the vessel and, optionally, (5) use of a pressure transmitter and an on/off logic program in the CPU to maintain the pressure in said vessel at some predetermined operating pressure.

Again, the hereindescribed apparatus and procedures are generally applicable to venting pressure vessels containing any fluidizable, solid particles, but they are especially useful in adding particulate catalyst materials to those FCC processes used to refine petroleum. Hence, particles of this type, used in this exemplary industrial process, have been and will be used to illustrate the inventive concepts of this patent disclosure. Consequently, for the purposes of this patent disclosure, the terms "catalyst" or "catalyst particle" should be taken in a broader sense to mean any fluidizable particulate material. Similarly the terms "FCC unit" or "FCC process" should be taken in a broader sense to mean any industrial process into which a particulate material is injected. In much the same vein, the term "airs" should be taken to mean any other gas such as nitrogen, hydrocarbon gases, etc. that are commonly used to entrain particulate materials in any industrial process wherein such particles are employed. And finally, for the purposes of this patent disclosure, the terms "valve" or "valve system" should be taken to imply the piping system that is connected to any given valve.

BRIEF DESCRIPTION OF THE DRAWINGS

FIG. 1 depicts an apparatus and process for introducing a particulate material into an industrial process according to the teachings of this patent disclosure.

DETAILED DESCRIPTION OF THE INVENTION

FIG. 1 depicts an apparatus 10 for introducing a particulate material 12 into an industrial process 14 via a pressurized vessel 16 that is provided with a weighing device 18 such as a load cell. In some particularly embodiments of this invention, the particulate material 12 can be understood to be a microspheroidal, bulk catalyst or a microspheroidal catalyst additive of the types commonly used in those fluid catalytic cracking units ("FCC unit(s)") used in petroleum refining operations. Be that as it may, a particulate material 12 is shown being delivered to the apparatus 10 through a line 20 leading from a particulate material source 22 via a particulate material flow control valve 24. The particulate material flow control valve 24 is electronically connected (via line 26) to a computer control unit ("CPU") 28. In effect, the CPU 28, in ways known to those skilled in the process control arts, commands and controls the apparatus elements and process steps of this invention based upon software program(s), process history data, signals generated by the process itself (e.g., the weight of the contents of the pressure vessel) and/or manual intervention actions. In one of the more preferred embodiments of this invention, the CPU's software will produce a schematic diagram of the apparatus and process on the CPU's display screen in order to graphically show the operator the progress of the refilling sequence.

Be that as it may, delivery of the particulate catalyst material 12 to the vessel 16 is preferably accomplished through use of a stream of pressurized gas 30, such as air, that entrains the particulate catalyst material 12 leaving valve 24 and carries it to the pressurized vessel 16 via line 32. This stream of pressurized air 30 can be controlled by valve systems (e.g., ball valve 34, globe valve 36 and check valve 38) known to those skilled in this art. All such valves can be driven by fluid pressure systems (air or hydraulic) or electrically driven motors (none of which is shown in FIG. 1). The gas pressure in line 32 also can be monitored by a gas pressure indicator 40. Thereafter, the same pressurized gas stream 30 can be used to help repressurize the vessel 16.

The particulate catalyst 12 residing in vessel 16 is delivered to the industrial process 14 through use of another stream of pressurized gas 42 (such as air, nitrogen, hydrocarbon, etc.). By way of example only, both gas streams 30 and 42 can be obtained from a common plant air system not otherwise shown in FIG. 1. Flow of the stream of pressurized gas 42 also can be controlled by valve systems (e.g., globe valve 44, check valve 46, particle flow control valve 48, check valve 50, globe valve 52) known to those skilled in this art. The pressure in line 42 also is preferably monitored by use of a pressure indicator 54.

Those skilled in these arts will appreciate that flow of particulate material 12 from the pressurized vessel 16 into line 42 can be carried out on a continuous, intermittent and/or "as needed", basis. Hence, particulate material 12 leaving the vessel 16 will pass through a particle flow control valve 48. This particle flow control valve 48 is electrically connected to the computer control unit 28 by line 49 in order to control flow of the particulate material 12 to the process 14 using it. Such particle flow control systems also are typically provided with emergency shut off valves e.g., manual shut off valve 56 and emergency shut off valve 57 which is shown under the control of the CPU 28 by line 59.

In a previously noted preferred embodiment of this invention, the vessel 16 is pressurized in a second phase by a second pressurized gas line 60 and gas injection valve 62 that are smaller in diameter than the line 32 and injection valve 34 that first carries particulate pressured gas to the vessel 16. Indeed, line 60 and valve 62 can serve to augment the repressurization carried out by gas stream 30 in a first phase of the repressurization of vessel 16 and then carry out a second phase of the repressurization process which brings the vessel pressure to its full operating pressure (e.g., 60 psi). This second, gas injection valve 62 can also serve to make ongoing adjustments in the operating pressure existing in vessel 16 using an on/off logic system controlled by the CPU 28.

By way of example of the relative sizes of these injection valves, in those embodiments of this invention used to deliver a microspheroidal catalyst additive to a 10–15 ton vessel that is to be operated at about 60 psi, line 32 preferably will be about 2 to 3 inches in diameter while line 60 will be about one half inch to about one inch in diameter. In these preferred embodiments, line 60 also will be provided with a pressure transmitter 66 which also is electrically connected to the CPU 28 e.g., via line 68. It might also be noted here that, because vessel 16 is pressurized (e.g., to pressures ranging from about 30 psi to about 150 psi) it is most preferably provided with a pressure relief valve 70.

In the more preferred embodiments of this invention, the valves controlled by the CPU 28 will operate in an "on/off" mode of operation. Various types of on/off type valves have certain advantages and disadvantages. Of those valves that operate on an on/off mode of operation, ball type valves are generally the most preferred. They are most preferred because they have proven to be especially reliable in processes that handle particulate materials. This reputation for reliability generally revolves around the fact that they give tight shut offs after many months or even years of service. They also are easy to actuate automatically, and have the added advantage of having quick signal response times.

Gate valves also operate on an on/off mode of operation. Hence they too could be used in the practice of this invention. They are, however, somewhat less preferred than ball valves because they sometimes do not give a tight shut off in particulate material applications. They are also more expensive than ball valves; they also are more difficult to actuate automatically; and they are relatively slow acting.

Globe valves can be used in those parts of this apparatus where there is no catalyst present (e.g., as the second, gas injection valve 62). This limitation follows from the fact that globe valves tend to erode much more quickly than either ball valves or gate valves in catalyst-carrying environments. They also are relatively more expensive than ball valves and somewhat more difficult to actuate automatically; they also are relatively slow acting compared to ball valves.

Diaphragm valves are commonly used on shot-pot type catalyst addition systems. They are relatively inexpensive, easy to actuate automatically and quick acting. However, they too are characterized by the fact that they do not last very long in catalyst handling operations. Moreover, they generally require relatively higher levels of maintenance relative to almost all other valve types.

Shuttle valves also operate on an on/off basis, but they can only be used to carry "clean" streams, such as a compressed air stream that does not carry the particulate material (e.g., gas injection valve 62). They also are not commonly available in large sizes, e.g., their maximum size is about 1". They also very quickly plug up when they are used to handle particulate materials. They are however extremely quick acting, and very, very reliable. Thus, they can be used in place of a ball type valve to deliver the second stream of air 60 to vessel 16.

Proportional valves are used throughout industry to variably control flowrates of liquids or gases. They have long useful lives—if they carry only air or liquid streams. For particulate material transfer purposes however, their useful lives generally will not exceed those of ball valves. They also are very fast acting. As previously noted however, one of their chief drawbacks (aside from their initial expense and greater maintenance requirements) lies in the fact that they require a proportional signal rather than an "on/off" type signal from the CPU. Thus, their use would add considerably more complexity and expense to the overall apparatus and processes of this invention disclosure. Proportional valves also cannot be relied upon to give as tight a shutoff as a ball valve over long service periods. This drawback follows from the fact that proportional valves are primarily designed to meter an ongoing flow (operating typically at about 40–60% open), rather than stop or start a 100% open or 100% closed flow pattern.

Regardless of the above-noted valve selection considerations, the vessel 16 depicted in FIG. 1 will be resupplied or replenished with a new supply of particulate material 12 when the remaining amount of said particulate material reaches a first prescribed "refills" amount which is graphically indicated by level 72 in vessel 16. It might also be noted at this point that a signal to start the vessel refilling operation can come from either the CPU 28 itself or from a master control room CPU (not shown in FIG. 1) used to control the entire industrial process. That is to say that the apparatus and processes of this invention can operate in a mode of operation wherein information concerning the weight of catalyst in vessel 16 (e.g., at level 72) is sent directly to a master control room CPU. Such a CPU in a master control room will therefore determine when level 72 is reached and then send an order to CPU 28 to commence a vessel refilling operation.

With either mode of determining when the vessel 16 is in need of refilling, a refill signal is generated by weighing the vessel 16 and its contents. To this end, the vessel 16 is mounted on one or more (preferably three) weighing devices 18 such as load cells. Consequently, it should be noted here that certain weighing conventions will need to be adopted for the practice of this invention. Generally speaking, these weighing conventions revolve around the fact that the vessel 16, its particulate contents and the gas used to pressurize said vessel each have mass. As a practical matter, however, applicant's processes are only concerned with the mass of the particulate material in the vessel 16. Hence, the weight of the vessel 16 and its pressurized gas contents are preferably "zeroed out" of the weighing calculations associated with these processes. The CPU 28 can be programmed to carry out such zeroing out processes so that only the weight of the particulate material itself is sought and acted upon. For example, the vessel 16 can be weighed when it contains a charge of pressurized air—or it can be weighed when it is completely vented. In either case, the CPU will preferably conduct a zeroing out operation that will ignore the weight of the vessel itself as well as the weight of any air contained in the vessel. Under normal operating conditions, the vessel 16 will contain a given amount of particulate material 12 and a given amount of pressurized gas when it reaches a predetermined weight that is suggested by level 72 in FIG. 1. Electrical signal information concerning the weight detected by the weighing device 18 is then sent to the CPU 28 (or to a master control room CPU) via electrical line 74. Thus, when the weight of the vessel and its catalyst and pressurized gas contents reaches the predetermined amount 72, the vessel 16 will have to be resupplied. Thus, the vessel 16 first must be vented. After such venting, particulate material 12 will be loaded into the vessel 16 until it reaches another prescribed level which is generally indicated in vessel 16 by indicator arrow 76. This second prescribed level also is detected by weighing the vessel 16 and its contents at level 76. At this point in the reloading procedure, the vessel 16 will not be repressurized. Hence, the CPU 28 could be programmed to make the appropriate zeroing out calculations based upon this "unpressurized" circumstance.

In a particularly preferred embodiment of this invention, however, the weight of the vessel 16 and its catalyst and its pressurized gas contents will the factors employed in a zeroing out calculation conducted by the CPU 28. In this particular zeroing out operation, the weight of the vessel and its particulate material and pressurized (e.g., to 60 psi) gas contents at level 72 will be the total weight which causes the CPU 28 to issue a command to replenish a catalyst supply in the vessel 16. After the vessel 16 is vented and filled with particulate material 12 to a predetermined replenishment level 76, it is repressurized to a given operating pressure (e.g., 60 psi) that normally will correspond to the same operating pressure (60 psi) extant when the particulate material reached level 72. The vessel 16 and its catalyst and pressurized gas contents preferably will be weighed under these conditions. The resulting weight figure is then compared to the weight of the vessel and its particulate material and pressurized gas contents when level 72 was reached. Thus, under this weighing convention—and in this preferred embodiment of applicant's invention—the weight of the vessel and its particulate material and pressurized gas contents, at predetermined level 72 is subtracted from the weight of the vessel 16 and its particulate material and pressurized gas contents at its refilled level 76 in order to best approximate the amount, by weight, of particulate material that was recharged into the vessel 16 in any given replenishment operation.

Be this preferred weighing convention as it may, those skilled in this art will appreciate that in order to resupply the vessel 16 with particulate material 12 (without having to use injection pressures higher than the vessel's operating pressure in order to inject catalyst into the vessel 16), the pressurized vessel 16 must be vented before it can be recharged with a new supply of particulate material. That is to say that the gas pressure (e.g., 60 psi) under which the vessel 16 is normally operated must be relieved to a much lower pressure before the vessel can be resupplied with fresh particulate material. Such a lower pressure will preferably be from about atmospheric pressure to about 2 psi.

In the most preferred embodiments of this invention, such venting of vessel 16 is not carried out using a single, small opening, vent valve or by using a proportional or variable opening valve, but rather is carried out in two distinct phases or stages using two separate and distinct on/off type vent valves that each have fully open/fully closed modes of operation (e.g., two ball type valves). The first, relatively smaller vent valve 78 operates during a first phase of the depressurization process. Hence it must have a relatively small (e.g., 0.5 inch) passage in order to deal with small volumes of high pressure gas (e.g., air). The second vent valve 82 operates during a second phase of the depressurization process that lowers the pressure in said vessel to a second, still lower, pressure (e.g., atmospheric pressure). The second vent valve will have a relatively large vent diameter (i.e., larger than that of the small vent valve). For example, in venting a 10–15 ton vessel, the large vent valve could be sized at about 2 to about 3 inches, while the smaller vent valve could be sized at about 0.5 to about 1.5 inches in diameter. Hence, the second vent valve will pass relatively larger volumes of air at pressures lower than those extant during the first phase of the depressurization process. In certain preferred modes of operation, the first phase of the depressurization process will lower the vessel pressure from a highest pressure (e.g., 60 psi) to a first lower pressure (e.g., 20–30 psi) which is at least 50% less than the highest pressure (e.g., it will lower said pressure from about 60 psi to about 30 psi). In another particularly preferred embodiment of this invention, the first vent valve 78 continues to perform its venting function while the second vent valve 82 carries out a major part of the second phase of the depressurization process (e.g., lowering the pressure from 30 psi to atmospheric pressure). In other words, in this preferred embodiment, the first vent valve 78 is not closed at the end of the first phase, but rather stays open during the second phase and thereby assists the second vent valve 82 in the second phase of the overall depressurization process.

To these ends, the first vent valve 78 is connected to the computer control unit 28 via line 80. Similarly, the second vent valve 82 is electrically connected to the CPU 28 via line 84. It might also be noted at this point that those vented gases sent through vent valve 78 may leave the apparatus 10 via gas vent line 85 and/or via gas vent line 86. These vented gases will typically pass through various downstream ancillary devices such as gas noise silencers, gas scrubbing devices, and/or so-called bag house devices and the like. It is also contemplated that, in another embodiment of this invention, the gas released in the first phase of the venting operation will be sent through a first vent flow system 85 equipped with certain particularly appropriate apparatus such as a gas silencer (not shown in FIG. 1) while gas released in the second phase of the venting operation can be released through a second vent flow system 86 leading to other kinds of downstream emissions equipment such as an electrostatic precipitator. In still another mode of operation the gas vented through valve 78 may be vented through line 86 along with the gas released in the second phase through valve 82. Thus, a crossover valve 87, controlled through CPU 28 via line 89, may be used to create such alternative venting procedures. This invention also contemplates use of $3^{rd}$ phase, $4^{th}$ phase, etc. venting operations which could likewise be carried by on/off type vent valves.

Thus, the main elements of applicant's apparatus 10 for more quickly replenishing a pressurized vessel 16 with particulate material 12 will comprise: (1) a CPU 28 for controlling operation of the apparatus and the processes of this invention; (2) a weighing device such as a scale or a load cell 18 for weighing the vessel 16 and its contents and for sending signals to the CPU 28 (or to a master control room CPU not shown in FIG. 1) based on the weight of the vessel 16 and its contents; (3) a vessel 16 for holding the particulate material 12 and a pressurized gas; (4) a first valve 48 for transferring the particulate material 12 from the vessel 16 to the industrial process 14; (5) a second valve 34 for transferring a stream of gas 30 to the vessel 16, (6) a third valve 24 for transferring particulate material 12 from a particulate material source 22 to the vessel 16 by entraining said particulate material 12 in the pressurized gas stream 30 passing from the second valve 34 to the vessel 16; (7) a first vent valve 78 for lowering a gas pressure in the vessel 16 from an initial pressure to a first lower pressure; and (8) a second vent valve 82 for lowering gas pressure in the vessel 16 from the first lower pressure to a second lower pressure. Most preferably, the overall apparatus will further comprise: (1) a fourth valve 62 for introducing a pressurized gas into the vessel 16 and (2) a pressure transmitter 66 that is placed under the control of an on/off logic system which, in turn, is under the control of the CPU 28 in order to maintain the operating pressure in the vessel 16 at some predetermined operating level (e.g., 60 psi).

The particulate material replenishment process carried out by this apparatus generally will comprise: (1) weighing a vessel 16 and its contents in order to determine when a predetermined, vessel recharge signal—generating, amount 72 of the particulate material 12 (determined by weighing the vessel and its contents) has been reached; (2) sending a signal to the CPU 28 (or to a master control room CPU) when said predetermined amount 72 of the particulate material has been reached, (3) having the CPU 28 initiate a vessel recharging operation that includes: (4) closing the first valve 48 that transfers particulate material 12 from the pressurized vessel 16 to the industrial process 14; (as an optional step in this process, the vessel 16 and its contents can be weighed just after the first valve 48 is closed; as another optional step, a second valve 62 for delivering pressurized air to the vessel 16 will be closed if such a second valve 62 is in fact employed in the apparatus 10, i.e., the second valve 62 is a preferred but, nonetheless optional, element of the overall apparatus 10); (5) opening the first vent valve 78 to carry out a first phase of the vessel depressurization process which lowers gas pressure in the vessel 16 from an initial pressure (e.g., a 60 psi operating pressure) to a first lower pressure (e.g., 10–30 psi); (6) opening a second vent valve 82 to carry out a second phase of the vessel depressurization process to lower the gas pressure in the vessel 16 from the first lower pressure (e.g., 10–30 psi) to a second lower pressure (e.g., atmospheric pressure); (7) opening the second valve 34 in order to transfer a stream of pressurized air 30 from a source of air pressure (not shown in FIG. 1) to the vessel 16; (8) opening a third valve 24 that transfers particulate material 12 from a particulate material source 22 to the vessel 16 by entraining said particulate material in the gas stream 30 that has passed through valve 34; (9) attaining a prescribed amount 76 of catalyst 12 in the vessel 16 by allowing the stream of pressurized air 30 to deposit its entrained catalyst 12 in vessel 16 and then depart from said vessel 16 via, now open, air vent valves 82 and/or 78; (10) closing the third valve 24 to shut off flow of the particulate material 12 from the particulate material source 22 to the vessel 16; (11) closing the first vent valve 78; (12) closing the second vent valve 82 (the order of closing of the first and second vent valves is optional); (13) introducing pressurized gas into the vessel 16 until a predetermined gas pressure, e.g., 60 psi, is attained (this introduction of pressurized gas can be accomplished using the same stream of pressurized air 30 that was previously used to entrain the particulate material 12 loaded into the vessel 16 via line 32), and in a still more preferred embodiment of this invention, a second pressurized air stream delivered via valve 62 is also used to repressurize vessel 16, especially in the final stages of the repressurization process); (14) weighing the vessel 16 and its contents to determine the amount of particulate material in said vessel 16; and (15) opening the first valve 48 to again allow transfer of particulate material 12 from the vessel 16 to the industrial process 14 using said material.

Other preferred embodiments of this process may further comprise: (16) weighing the vessel 16 and its contents when the vessel 16 contains particulate material, but does not contain pressurized gas, (17) introducing a pressurized gas into the vessel 16 via line 32 until a first predetermined gas pressure is attained; (18) introducing pressurized gas into the vessel 16 via line 60 until a second pressure (usually, the final operating pressure (e.g., 60 psi)) is attained; (19) maintaining the pressure in the vessel 16 through use of an on/off logic system that receives signals from a pressure transmitter 66.

Description of a Particularly Preferred Refilling Operation

In one particularly preferred embodiment of this invention, a catalyst-containing vessel 16 is replenished completely automatically in the following manner:

Weight Detection (1) The CPU 28 will receive a signal from an industrial process (e.g., from a CPU in a master control room for the overall industrial process) telling the CPU 28 to start an automatic refilling operation.

Initiation (2) A current state of the process screen on the CPU 28 will change to an automatic refilling screen in order to inform the operator of the progress of the refilling operation.

(3) The apparatus 10 will be directed into a suspend additions mode.

(4) Pressurization air valve 62 (if employed) to the vessel 16 will be closed.

(5) Particulate material delivery valve 48 will be closed.

Stage 1—De-Pressurization (6) Small vent valve 78 will be opened to start the first phase of the vessel depressurization process.

(7) When the pressure drops to a first predetermined lower level (e.g., 25–50% of the normal operating pressure 60 psi, e.g., 10–30 psi), the second, larger, vent valve 82 will open to initiate a second phase of the depressurization process.

(8) When the pressure drops to a second predetermined setpoint pressure (e.g., atmospheric pressure) the depressurization process will be deemed complete and the CPU 28 will start the refilling process.

Stage 2—Refilling (9) A carrier air stream 30 will be turned on by opening injection valve 34.

(10) After a short interval (e.g., about 10–30 seconds), valve 24 (which is located underneath the main catalyst storage vessel 22) will be opened, thereby allowing particulate material 12 to be transported by the pressurized air stream 30 into the vessel 16.

(11) When the weight of vessel reaches a predetermined level (e.g., 15 tons at level 76 in vessel 16), the particulate material delivery valve 24 is closed. At this stage the refilling sequence will be deemed complete and the CPU 28 will start the repressurization operation.

(12) The carrier air valve 34 will preferably remain open to assist in repressurizing the vessel 16 in the next phase of the particulate material replenishment procedure.

Stage 3—Repressurization

As the procedure enters this phase of the overall replenishment operation, the carrier air valve 34 is preferably still open from the previous stage.

(13) Vent valves 78 and 82 are each closed.

(14) Injection valve 62 to vessel 16 is opened.

(15) When the pressure in the vessel 16 reaches a first setpoint, e.g., about 80% of the final pressure (e.g., a 60 psi operating pressure) e.g., when it reaches about 48 psi (80% of 60 psi), the carrier air valve 34 is closed.

(16) The second, air injection valve 62 will deliver pressurized air to the vessel 16 in a second phase of the repressurization process until the vessel pressure reaches its final operating pressure (e.g., 60 psi).

(17) When the pressure in the catalyst addition system reaches its predetermined final pressure (e.g., 60 psi), the repressurization process is deemed complete. The vessel pressure should be brought up to its full operating level (e.g., 60 psi in a 10–15 ton vessel) before any addition of particulate material 12 to process 14 is attempted. This circumstance will help ensure that the particulate material 12 flows only in the direction of the industrial process 14 using it—and not "backward" through applicant's apparatus 10.

Completion

(18) When all three of the previously noted stages in the replenishment procedures have been successfully completed, the CPU 28 will put the apparatus 10 back online, and the CPU's screen will return to a normal mode of operation screen.

Those skilled in this art also will appreciate that while this invention generally has been described in terms of the general discussions, specific examples, drawing and preferred embodiments, none of these should be taken individually as a limitation upon the overall inventive concepts which are set forth in the following claims.

Thus, having disclosed this invention, what is claimed is:

1. An apparatus for introducing particulate material into an industrial process, said apparatus comprising:
    (1) a CPU for controlling operation of apparatus;
    (2) a weighing device;
    (3) a vessel for holding the particulate material and pressurized gas, wherein said vessel and at least one of said particulate material and said pressurized gas are weighed by said weighing device;
    (4) a first valve for transferring the particulate material from the vessel to the industrial process;
    (5) a second valve for transferring a first stream of pressurized gas from a source of pressurized gas to the vessel;
    (6) a third valve for transferring the particulate material from a particulate material source to the vessel by entraining said particulate material in the first stream of pressurized gas;
    (7) a first vent valve for lowering a gas pressure in the vessel from an initial pressure to a first lower pressure; and
    (8) a second vent valve for lowering a gas pressure in the vessel from the first lower pressure to a second pressure lower than said first lower pressure, wherein said second vent valve is larger than said first vent valve.

2. The apparatus of claim 1 that further comprises a fourth valve for transferring a second stream of pressurized gas from a source of pressurized gas to the vessel.

3. The apparatus of claim 1 that further comprises a pressure transmitter that provides signals to the CPU that enable said CPU to control the pressure in the vessel through use of an on/off logic control system.

4. An apparatus for introducing a particulate, catalyst material into a fluid catalytic cracking process, said apparatus comprising:
    (1) a CPU for controlling operation of the apparatus;
    (2) a load cell weighing device;
    (3) a vessel for holding the particulate, catalyst material and pressurized air, wherein said vessel and at least one of said particulate, catalyst material and said pressurized air are weighed by said load cell weighing device;
    (4) a first valve for transferring the particulate, catalyst material from the vessel to the fluid catalytic cracking process;
    (5) a second valve for transferring a first stream of pressurized air from a source of pressurized air to the vessel;
    (6) a third valve for transferring the particulate, catalyst material from a particulate, catalyst material source to the vessel by entraining said particulate, catalyst material in the first stream of pressurized air;
    (7) a fourth valve for transferring a second stream of pressurized air from a source of pressurized air to the vessel;
    (8) a first vent valve for lowering air pressure in the vessel from an initial, operating pressure of about 60 psi to a first lower pressure of less than about 30 psi; and
    (9) a second vent valve for lowering air pressure in the vessel from a first lower pressure of less than about 30 psi to a second pressure of about atmospheric pressure, wherein said second vent valve is larger than said first vent valve.

5. A process for introducing a particulate material into an industrial operation, said process comprising:

(1) placing the process under control of a CPU;
(2) weighing a vessel and its contents to determine when a predetermined, vessel recharge signal-generating, amount of the particulate material has been reached;
(3) generating a signal when the predetermined, vessel recharge signal-generating amount of the particulate material has been reached and thereby initiating a vessel recharging program;
(4) closing a first valve that transfers the particulate material from the vessel to the industrial operation;
(5) opening a first vent valve to lower a gas pressure in the vessel from an initial pressure to a first lower pressure;
(6) opening a second vent valve to lower the gas pressure in the vessel from the first lower pressure to a second, still lower, pressure, wherein said second vent valve is larger than said first vent valve;
(7) opening a second valve that transfers a stream of pressurized gas from a source of pressurized gas to the vessel;
(8) opening a third valve that transfers particulate material from a particulate material source to the vessel by entraining said particulate material in the stream of pressurized gas passing through the second valve;
(9) determining that a predetermined amount of the particulate material is in the vessel by weighing said vessel;
(10) closing the third valve to prevent flow of particulate material to the vessel;
(11) closing the first vent valve;
(12) closing the second vent valve;
(13) closing the second valve when a first predetermined pressure is attained in the vessel;
(14) weighing the vessel and its contents to determine an amount of particulate material added to the vessel; and
(15) opening the first valve to allow transfer of the particulate material from the vessel to the industrial operation.

6. The process of claim 5 that further comprises closing a fourth valve that delivers a pressurized gas to the vessel after the first valve that delivers particulate material to the industrial operation is closed.

7. The process of claim 5 that further comprises opening a fourth valve that delivers pressurized gas in order to introduce said pressurized gas into the vessel.

8. The process of claim 5 wherein a weighing of the vessel and its contents is carried out when the vessel contains particulate material and pressurized gas.

9. A process for introducing particulate, catalyst material into a fluid catalytic cracking unit, said process comprising:

(1) placing the process under the control of a CPU;
(2) weighing a vessel and its contents to determine when a predetermined, vessel recharge signal-generating, amount of the particulate, catalyst material has been reached;
(3) generating a signal when the predetermined, vessel recharge signal-generating amount of the particulate material has been reached and thereby initiating a vessel recharging program;
(4) closing a first valve that transfers the particulate, catalyst material from the vessel to the fluid catalytic cracking unit;
(5) closing a fourth valve that transfers a second stream or pressurized air from a pressurized air source to the vessel;
(6) opening a first vent valve to lower air pressure in the vessel from an initial pressure of about 60 psi to a first lower pressure of less than about 30 psi;
(7) opening a second vent valve to lower the air pressure in the vessel from the first lower pressure to about atmospheric pressure, wherein said second vent valve is larger than said first vent valve;
(8) opening a second valve that transfers a stream of pressurized air from a source of pressurized air to the vessel;
(9) opening a third valve that transfers particulate, catalyst material from a particulate material source to the vessel by entraining said particulate, catalyst material in the stream of pressurized air passing through the second valve;
(10) determining that a predetermined amount of the particulate, catalyst material is in the vessel by weighing said vessel;
(11) closing the third valve to prevent flow of particulate, catalyst to the vessel;
(12) closing the first vent valve;
(13) closing the second vent valve;
(14) opening the fourth valve in order to introduce pressurized gas into the vessel;
(15) closing the second valve when a first predetermined pressure is attained in the vessel;
(16) closing the fourth valve when a second predetermined pressure that constitutes a final operating pressure is attained in the vessel;
(17) weighing the vessel and its contents to determine an amount of particulate, catalyst material added to the vessel; and
(18) opening the first valve to allow transfer of the particulate, catalyst material from the vessel to the fluid catalytic process.

10. The process of claim 9 wherein said first predetermined pressure is about 80 percent of final operating pressure.

11. The process of claim 9 wherein a weighing of the vessel and its contents occurs when the vessel contains particulate material and air pressurized to about 60 psi.

* * * * *